March 8, 1960    M. J. MAYNARD    2,927,833
PATH RECORDING SYSTEM
Filed Sept. 27, 1956

Inventor
MEADE J. MAYNARD
By
Attorney

United States Patent Office 2,927,833
Patented Mar. 8, 1960

2,927,833

PATH RECORDING SYSTEM

Meade J. Maynard, West Caldwell, N.J., assignor to International Telephone and Telegraph Corporation, Nutley, N.J., a corporation of Maryland Application September 27, 1956, Serial No. 612,528

5 Claims. (Cl. 346—8)

This invention relates to three-dimensional recording and in more particular to a system for recording visually the path of movement of an object in space.

An object of this invention is to provide an improved system for recording the flight path of an object in space.

Another object of this invention is to provide a three-dimensional recording system for tracing on a three-dimensional record the path of an object detected in space.

A more specific object of this invention is to obtain information of an object moving in space with reference to the X, Y and Z coordinates and to utilize this information to record consecutive positions of the object on a given medium to indicate the path of movement of the object.

A feature of the invention is to provide a plurality of transparent panel members arranged in parallel relation along the Z axis to represent planes in space and by means of information obtained on the movement of an object in space to mark each panel according to the X, Y position of the object as it passes through or along the planes represented by said panel members.

Figure 1:
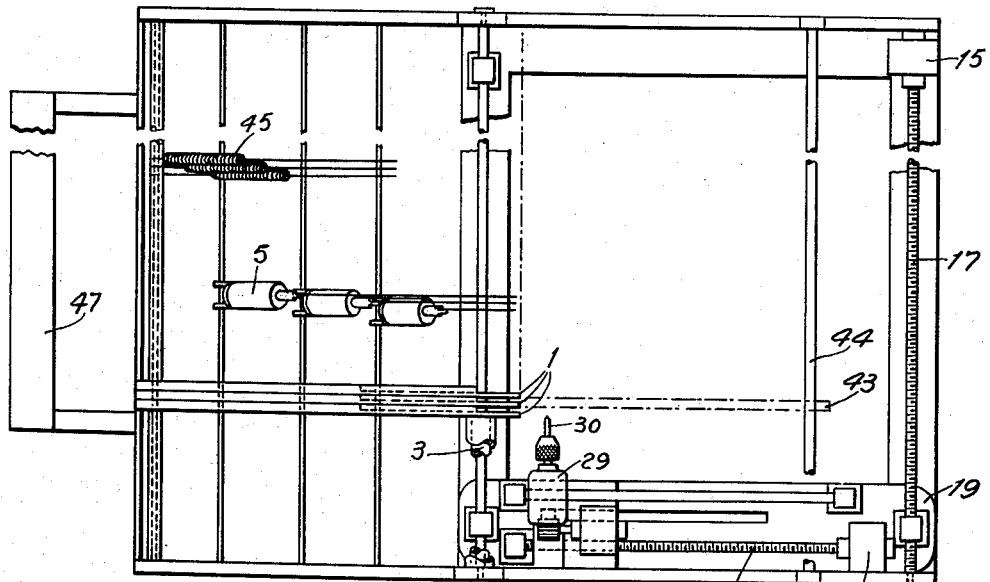
Figure 2:
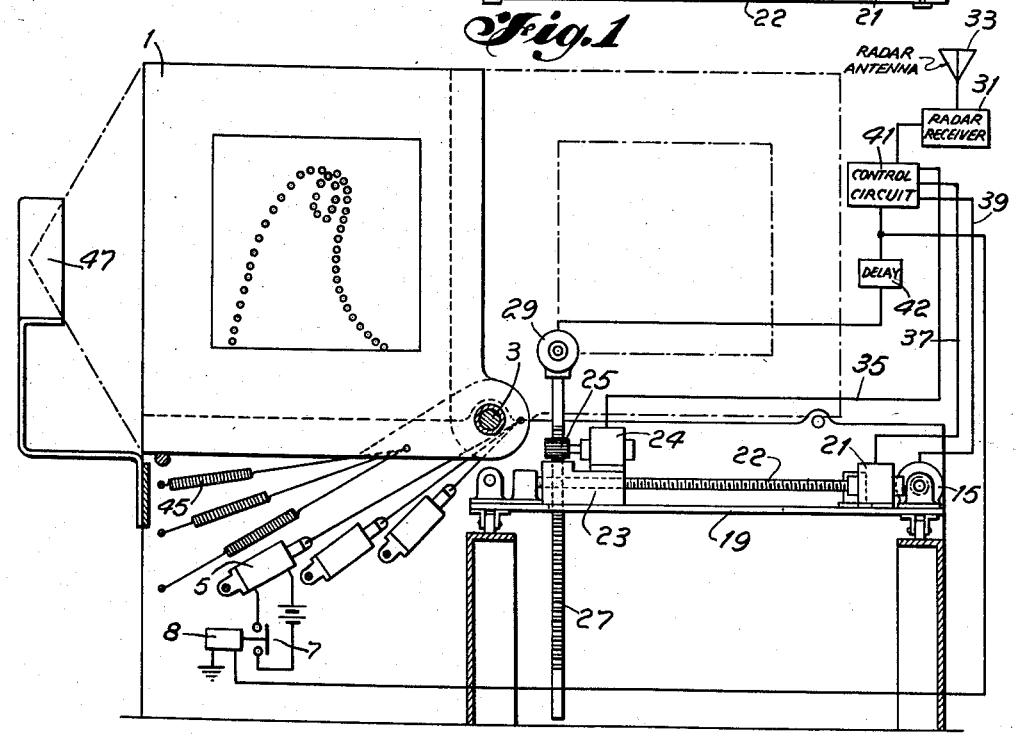

Other objects and features of the invention will be obvious from a study of the specifications and the accompanying drawings and wherein:

Figure 1 is a plan view of the recording structure according to the invention; and Figure 2 is an end view in elevation of the recording structure showing in combination therewith a radar unit for detecting objects in space.

In general the invention comprises a series of transparent panel members each pivotally mounted and adapted to rotate about an axis in response to solenoid operation. A three member coordinate axial system of servos is arranged to receive position information from a signal receiving system and undergo a transitory axial movement indicative of the spacial movements of an object, first along the Z or distance axis and second along the X and Y axes for each predetermined plane represented by said panels along the Z axis. An engraving tool or other marking device is fixedly mounted to one of said axial members and adapted to mark, drill, punch or otherwise produce some permanent marking on each transparent member in accordance with the X, Y position information received, thereby producing a series of markings on the panel members, representative of the flight path of the object.

Referring now in more detail to Figures 1 and 2, there is shown a system, according to the invention, for tracing out the flight path of an object such as aircraft or a guided missile trajectory. A series of clear panel members 1, made preferably from transparent Lucite and the like, are hingedly mounted to a shaft 3, each being made to tilt or rotate about said shaft in response to the operation of its respective solenoid 5. The panel members 1 occupy substantially the entire recording space between the bearings which support the shaft 3 although only a few panel members are shown for purpose of illustration. Each such solenoid is controlled by a selector switch 7 preferably operated, at equally spacial intervals of time, by a relay 8.

A three-coordinate axial servo system is shown wherein the coordinate axes are at right angles to each other and made to undergo a reciprocating motion in accordance with position information received from a signal receiving source. In operation, the Z-servo receives position information indicative of the spacial position of the object along the Z-axis and causes the said Z-servo to undergo a transitory change according to such information. The Z-servo movement is transmitted via servo motor 15 and worm gear 17 to a carriage 19. This carriage supports the X-axis and Y-axis servos. As the support carriage 19 is made to undergo its transitory movement in response to Z-axis position information, the X and Y axis servos are moved therewith along the Z-axis. The X and Y servos receive separately position information from a signal source indicative of the spacial position of the object in space in the X and Y direction respectively and thus produce the transitory movement of the X and Y servos accordingly. The Y-servo 21 is fixedly mounted to the carriage 19 and drives via a worm gear 22 the Y-axis carriage 23 in response to the Y-position signal information. Mounted to and movable with the carriage 23 along the Y-axis is X-servo 24 which drives via a pinion gear 25 the X-axis ratchet 27 in the X-direction in response to X-position signal information. Essentially the X-axis ratchet 27, undergoes a movement along the X, Y, and Z axes, thus integrating a three-dimensional travel, responsive to the signals which are indicative of the spacial position of the object or element in space.

In order to effect a permanent record of the three-dimensional travel of the X-axis ratchet 27, a recording mechanism is fixedly mounted to one extremity of the ratchet 27 along the X-axis and made to function in response to axial movements of ratchet 27. One such mechanism can take the form of an engraving device comprising a drive motor 29 and drill 30 to produce small indentations in the record medium, such as Lucite and the like, in accordance with received position information.

According to one embodiment of the invention, the system functions in the following manner; a radar receiving system comprising a receiver 31 and an antenna 33 may be employed to obtain spacial information of an object in space, such as a guided missile. The information from the radar 31 is fed into a control circuit 41 which contains circuitry well known in the art such as described in chapters 6 and 7 of the publication, "Electronic Instruments," volume 21 of the Radiation Laboratory Series, published by McGraw-Hill Book Company, Inc. This circuitry derives from the radar signal the position information of the object in the X, Y and Z coordinates at discrete intervals of time. The control circuit 41 also contains a device such as the well known recording voltmeter (Model R "Micromax") manufactured by Leeds and Northrup Company, 4991 Stenton Avenue, Philadelphia 44, Pa. This voltage recording control measures the level of the Z signal that gives an indication of the Z position of the object in space, but instead of the usual stylus there is substituted a brush-commutator arrangement of known form, the segments of which are connected to the relays 8 which control the movement of the panel members 1. The X position information is transmitted via lead 35 to the responsive X-servo 24, the Y-position information is transmitted to the Y-responsive servo 21 via lead 37, and the Z-position information is transmitted via lead 39 to the responsive Z-servo 15. The recording mechanism attached to the X-axis undergoes a three-dimensional traverse in accordance with the above mentioned X, Y, and Z position information. At each such discrete time interval the control circuit 41 applies a signal to relay 8 and after a short delay in delay device 42 to the recording mechanism to control its function in producing and identifying mark, identation, and the like, as the mechanism undergoes its responsive movements in tracing out the spacial movements of the object in space.

As previously described the medium, upon which the identifying marks or indentations are made, is a series of clear Lucite sheets, each pivotally operated by a solenoid 5 associated therewith, which is in turn responsive to the operation of the control circuit 41. It is possible for any given panel or sheet to receive a plurality of markings, in accordance with the path taken by the object, whenever a given position along the Z-axis is reoccupied.

As shown in Figure 2, the Lucite sheet 43 is shown in dotted lines pivotally rotated about an axial shaft 3 in a clock-wise direction, where its rotational movement is limited by an elongated axial rod 44 acting as a stop. Upon removal of the excitation signal, the solenoid 5 is released and the Lucite sheet 1 restored to its original position by the tensional forces exerted by coil spring 45. The markings or indentations on the sheets are made patently visible by providing a source of light 47 along the edges of the Lucite sheets, thus the spacial path traversed by a missile or other object in space will be observable as a dotted line pattern.

While I have shown only one preferred embodiment of my invention by way of illustration, many modifications will occur to those skilled in the art. The arrangement of the servos as illustrated may be modified or changed to produce the same three-dimensional axial movements heretofore described. Although a radar receiving system for producing position information is shown, other systems for producing position information representative of three-dimensional movements can be used as well and applied to the servos for causing appropriate axial movements of the ratchet arms. It is possible to provide some means for storing position information, such as a memory device and the like and subsequently using the stored information whenever time permits. Although for purposes of marking and indentation a drill is shown, other means and methods can be used such as by the use of fluorescent materials which are useful for marking in the form of yellow fluorescent tape applied in dots by appropriate devices.

I claim:

1. A system for making a visual recording of the movement of an object in space comprising, a plurality of movable parallel transparent panel members, each of said members representing a plane disposed in space, a marking device, a source of spacial position information of said object in space, and means responsive to said position information for moving said panel members selectively and for animating said marking device and causing it to inscribe a visual path on said members indicative of the flight path of said object.

2. A system for making a visual recording of the movement of an object in space comprising a plurality of movable parallel spacial transparent panel members each representing a plane in space, a marking device, a source of spacial position information of said object in space, means responsive to said position information for selectively positioning said members relative to said marking device and means responsive to said source of spacing information for causing said marking device to inscribe on each selected panel member a mark corresponding to the path of movement of said object in the plane of the selected member.

3. A system tracing a visual flight path of the movement of an object in three-dimensions comprising a plurality of parallel spaced transparent panel members each representing a plane in a given space, a pivot, said members being pivotally mounted for rotation about said pivot, an indicator device, means for obtaining spacial signals to provide three-dimensional information indicative of the spacial position of the said object in space, means responsive to certain of said three-dimensional information signals for selectively rotating said pivotally mounted panel members in accordance with the plane to which said information relates, and means responsive to said three-dimensional information signals including mutually perpendicular reciprocating elements for animating said indicator device and causing it to trace out a visual path on said selective panel members indicative of the flight path of said object.

4. A system for tracing a visual flight path of an object in three-dimensions comprising a plurality of parallel spaced transparent panel members each pivotally mounted and adapted to rotate about a given axis, a marking device, means for obtaining spacial signals and adapted to provide three-dimensional information with regard to the movement of said object, means responsive to certain of said three-dimensional information signals including means for selectively rotating said pivotally rotatable panel members into a position for coaction with said marking device, a set of three directional guiding means disposed along three mutually perpendicular axes, each guiding means having a servo mechanism associated therewith for reciprocating movements relative to the other, said marking device being carried by one of said guiding means, and means responsive to said three-dimensional information signals including said servos for animating said marking device and causing it to mark selected panel members to thereby trace visual path on said panel members indicative of the flight path of said object.

5. A system for tracing a visual flight path of an object in three-dimensions comprising a three-dimensional assembly of paralleled spaced transparent panel members each representing a plane in said assembly, a scribing device, means for receiving spacial signals and adapted to provide three-dimensional information with regard to the movement of said object, means responsive to certain of said information signals for selectively moving said panel members into position for coaction with said scribing device, a set of at least three servo elements disposed for movement along three mutually pendicular axes, relative to the other, one of said elements having mounted thereon the said scriber device, and means responsive to said information signals including said servos for animating said scribing device and causing it to trace on said selective panel members indications indicative of the flight path of said object.

References Cited in the file of this patent

UNITED STATES PATENTS

| 1,726,126 | Scheppemann | Aug. 27, 1929 |
| 1,851,774 | Rogers | Mar. 29, 1932 |
| 2,413,300 | Dunn et al. | Dec. 31, 1946 |
| 2,628,539 | Neergaard | Feb. 17, 1954 |
| 2,665,187 | Kinley et al. | Jan. 5, 1954 |

FOREIGN PATENTS

| 767,539 | France | May 1, 1934 |